Nov. 18, 1969  J. H. ROBERTS  3,478,875
METHOD AND APPARATUS FOR SEPARATING NUT MEATS FROM SHELLS
Filed Sept. 27, 1966  4 Sheets-Sheet 1
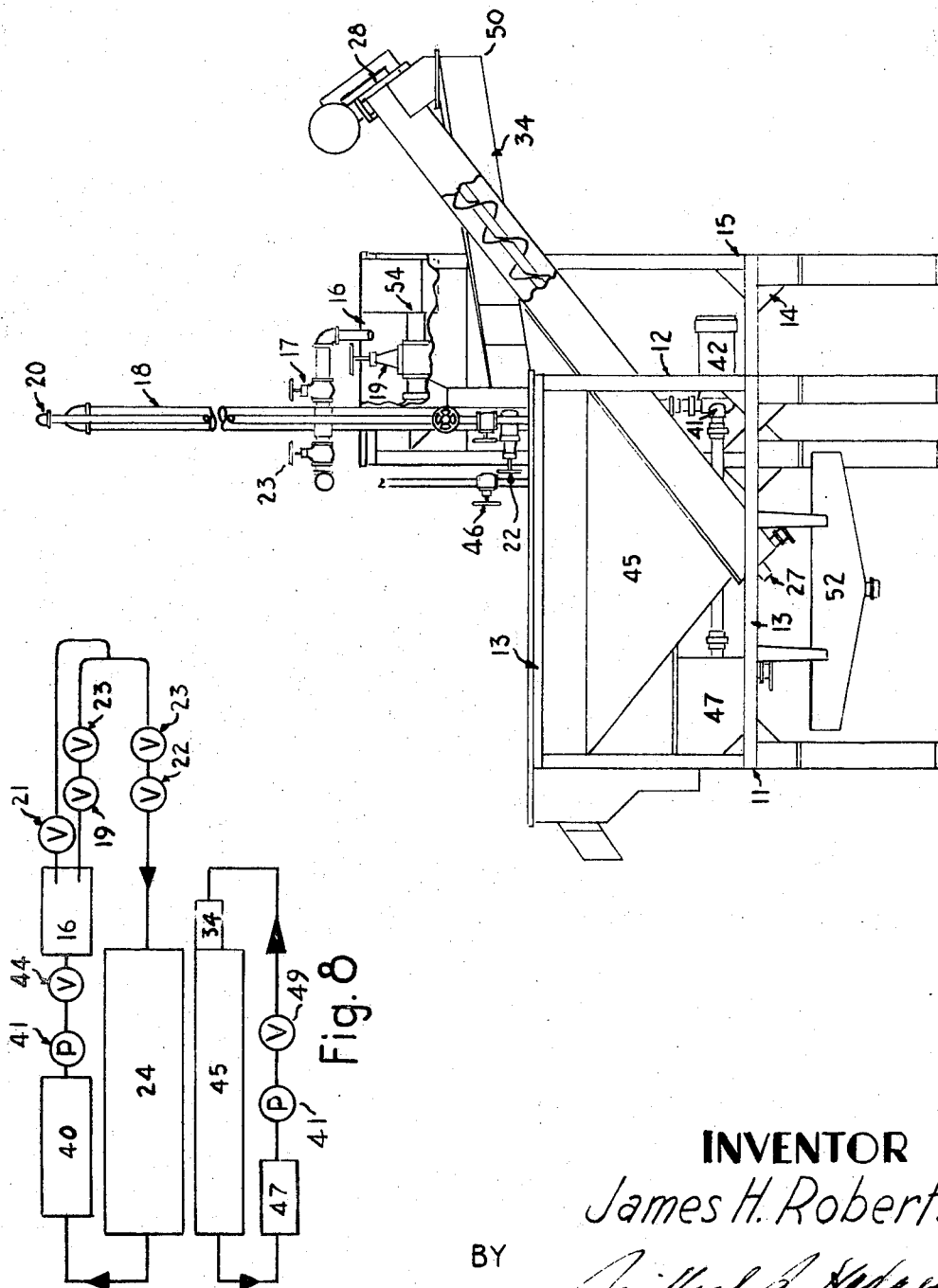
INVENTOR
James H. Roberts
BY
ATTORNEY

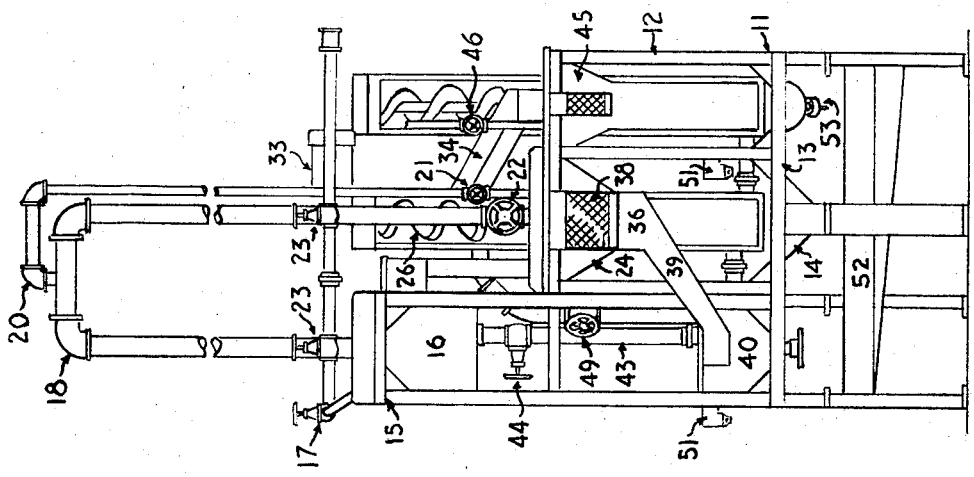
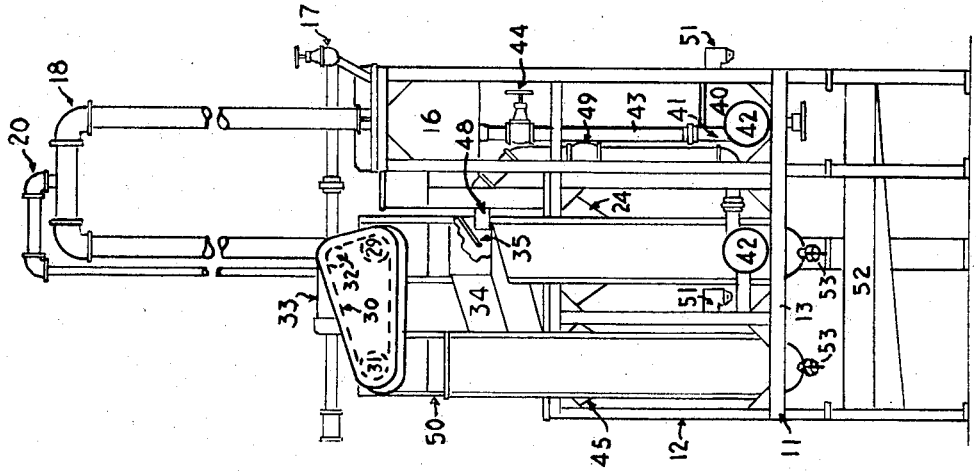

Nov. 18, 1969   J. H. ROBERTS   3,478,875
METHOD AND APPARATUS FOR SEPARATING NUT MEATS FROM SHELLS
Filed Sept. 27, 1966   4 Sheets-Sheet 3

INVENTOR
James H. Roberts
BY
ATTORNEY

FLOW CHART OF SOLIDS AND LIQUIDS
LEGEND: MEATS ■■▶■, SHELL ――▶―, WATER ―▶―.
PRIMARY SYSTEM
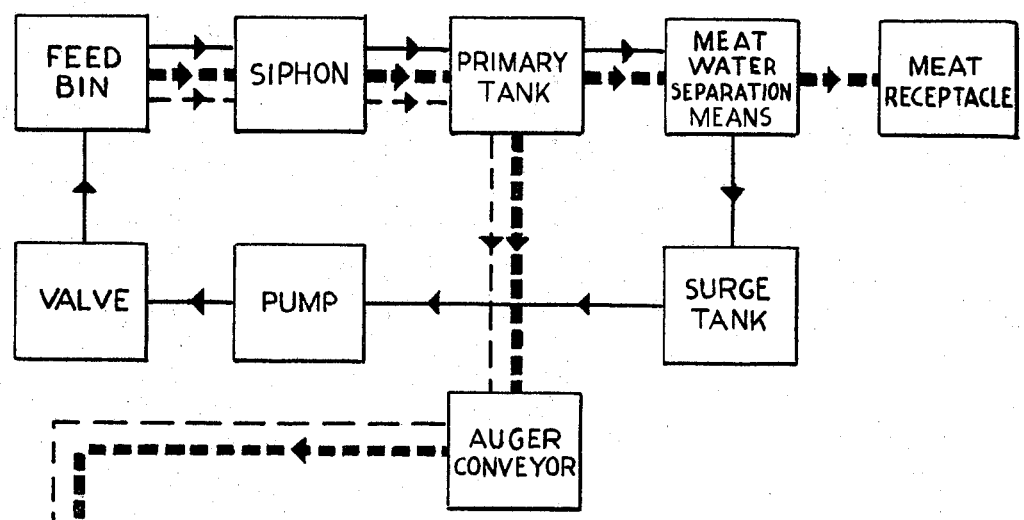
SECONDARY SYSTEM
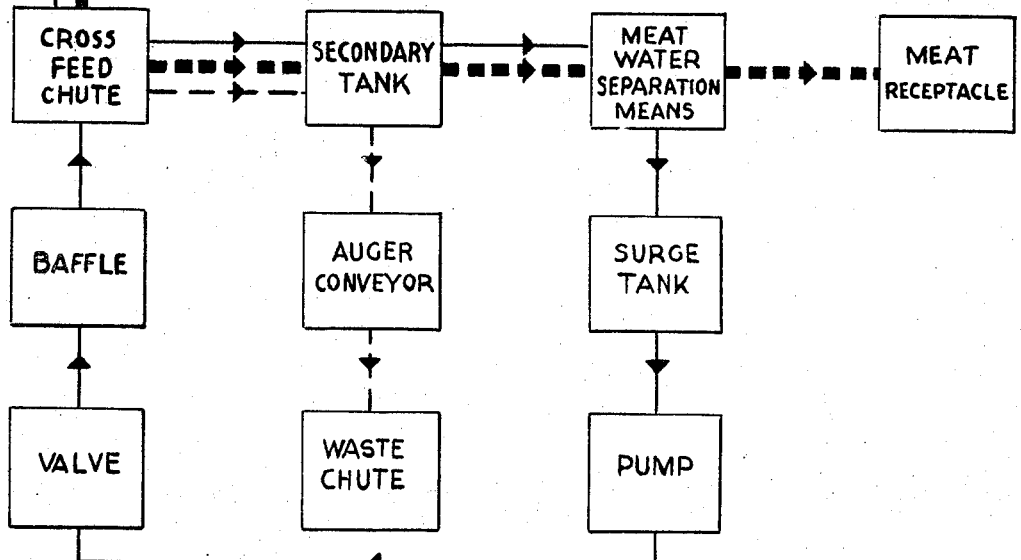
Fig. 9

United States Patent Office

3,478,875
Patented Nov. 18, 1969

3,478,875
METHOD AND APPARATUS FOR SEPARATING NUT MEATS FROM SHELLS
James H. Roberts, 126 Verdant,
San Antonio, Tex. 78209
Filed Sept. 27, 1966, Ser. No. 582,306
Int. Cl. B03l 9/00
U.S. Cl. 209—2                                  8 Claims

ABSTRACT OF THE DISCLOSURE

The method and apparatus for separating nutmeats from shell mixture comprising siphoning the mixture in an aqueous fluid, deflecting the discharge along the surface of a tank, flowing the aqueous fluid carrying buoyant meats into a pervious meat chute, recovering the separated meats and recirculating the fluid, conveying the non-buoyant mixture from the tank and depositing the mixture along the surface of an aqueous fluid in a second tank; flowing the fluid and buoyant nut meats into a pervious meat chute, recovering the nut meats, recirculating and maintaining the fluid in the secondary tank at an elevated temperature, and conveying the non-buoyant shells from the secondary tank.

---

This invention relates to a novel process and apparatus for separating the nut meats from the shells of cracked nuts and includes a more economically produced improved apparatus for recovering the maximum amounts of nut meats in the processing of cracked nuts.

The utilization of machines for cracking nuts and separating meats from the shells is broadly old in the art. The elaborate process and machinery required to accomplish the separating process known in the prior art is too often of necessity exceedingly expensive. Processes and apparatus required by the prior art frequently require substantial quantities of water. The prior art has used vacuum pumps in the operation of the siphon means. Such pumps are susceptible of clogging and malfunctions for other reasons. A desire to overcome certain inadequacies in the state of the art prompted the making of the improvements which constitute this invention.

The present invention utilizes the well known process of placing the cracked nuts in a liquid under a partial vacuum condition, thereby evacuating the air from the shells and filling the void with water. This stage of the process can effectively be accomplished by sucking the cracked nut water combination over a siphon tube having an apex approximately 28 feet high.

The simplified and improved method and apparatus of the subject invention utilizes a natural flow siphon to subject the cracked nut water mixture to sub-atmospheric pressure returning the mixture to atmospheric pressure in a flotation tank where surface turbulence is controlled, nut meats are recovered from the surface. The nut meat and shell combination not separated by first flotation step are then subjected to further processing in a second tank at an elevated temperature when surface flow is again controlled to recover the optimum amount of buoyant nut meats.

One object of the invention is an improved natural flow siphon means to be utilized in subjecting a cracked nut liquid mixture to a partial vacuum environment.

Another object of this invention is to provide improved apparatus for further processing of the nuts after they have completed the step of being emersed in a liquid under partial vacuum condition.

Another object is to separate the meats from the shells in such a manner as to recover the maximum amount of nut meats.

Another object is to effectively accomplish the step of removing the meats from the nut at a minimum cost in machinery.

Still another object of the invention is compactness.

An object accomplished by the present invention is a relative conservative use of water.

Figure 4:
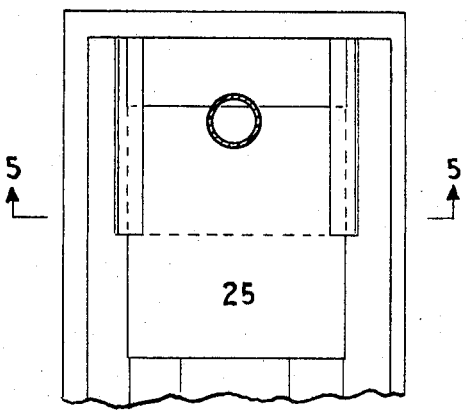
Figure 5:
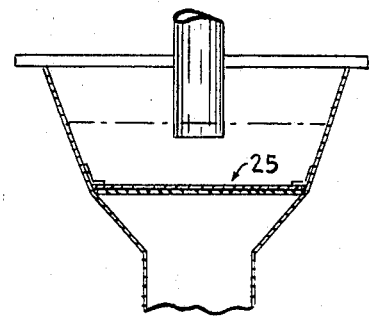
Figure 6:
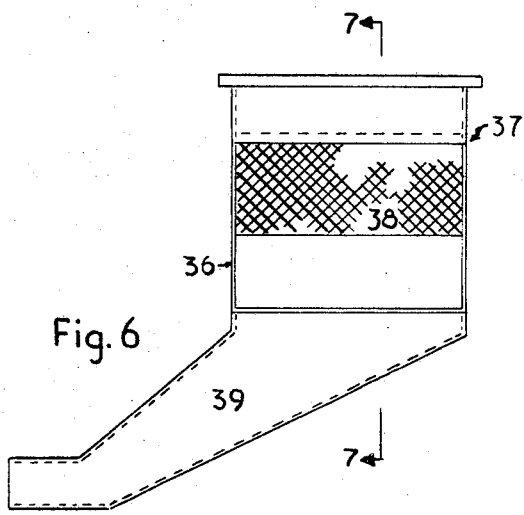
Figure 7:
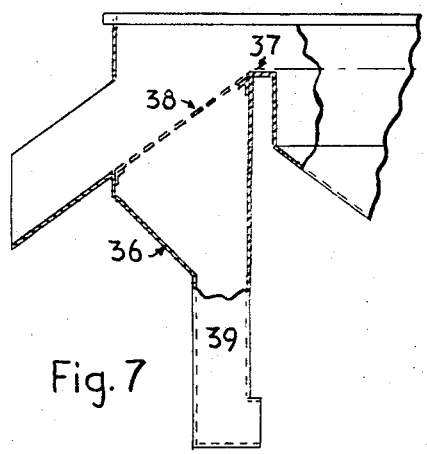

Other objects and features of the invention will become apparent to those skilled in the art as the disclosure is made in the following detailed description of preferred embodiments of the invention as illustrated in the accompanying sheets of drawings in which:

FIG. 1 is a left side elevation.
FIG. 2 is a shell discharge end elevation.
FIG. 3 is a meats discharge end elevation.
FIG. 4 is an enlarged fragmentary top view partially in section of the shell discharge end of the primary recovery tank disclosing the discharge end of the siphon and the slidable shelf.
FIG. 5 is an enlarged plan view partially in section of FIG. 4 taken substantially on line 5—5 looking in the direction of the arrows.
FIG. 6 is an enlarged fragmentary plan view of the meat discharge end of the primary recovery tank disclosing the nut meat water separation means.
FIG. 7 is an enlarged fragmentary left side elevation partially in section of FIG. 6 taken on line 7—7 looking in the direction of the arrows.
FIG. 8 is a schematic diagram of the fluid recirculation flow appertaining to the primary recovery tank and the siphon means, and the flow related to the secondary recovery tank.
FIG. 9 is a schematic diagram depicting the flow circuits through the device of aqueous fluid, nutmeats shell mixtures, and the various component parts when separated.

The present invention may be employed with various species of nuts but will be more particularly described in this specification as pertains to the processing of pecans.

The utilization of this invention is envisioned in a factory processing substantial quantities of nuts for the wholesale market. The equipment hereafter described is designed to separate the nut meats from the shells of cracked nuts. It is contemplated that a suitable cracking machine will be utilized which is capable of supplying a constant flow of cracked nuts by means of a conveyor. It is further contemplated that processing machinery will be interconnected to this machine which is capable of drying the separated nut meats and of delivering the nut meats to an appropriate container as they flow from this machine.

Referring now to the drawings, wherein like reference characters designate like or corresponding parts throughout the several views, there is shown in FIG. 1, the principal components of this machine consist of a recovery tank frame member 11 to which the recovery tanks and nut meat water separating means are securely attached. The frame is constructed principally of angle iron and is composed of upright members 12 interconnected with upper and lower diagonal members 13 forming a box like structure. The frame is reinforced with triangular gussets 14 which are welded in each corner. The preferred method of attaching the various components of the entire frame is by electric arc weld.

The construction of the feed bin frame member 15 is virtually identical to the recovery tank frame member 11 except for its dimensions.

Referring to FIGS. 2 and 3, secured to the feed bin frame member 15 is a feed bin 16 into which cracked nuts are deposited by a conveyor (not shown). Adjacent to and emptying into the feed bin 16 is a water feed valve 17. The recovery tank frame 11 and the feed bin frame 15 are welded together to form one structure.

The combined structure serves as a principal support for the siphon means 18. Originating in the feed bin 16 is the siphon means 18 incorporated in the machine. Referring to FIG. 1, near the origin end of the siphon 18 is mounted an inlet valve 19. Opening into the apex of the siphon 16 is a bleeder pipe 20 which has its terminus adjacent the outlet valve 22. Mounted near the end of the bleeder pipe is a bleeder valve 21. Leading into the siphon 18 between the inlet 19 and outlet valve 22 are two starter valves 23 one in which leg of the siphon 18. Each of these valves is attached to an external pressurized water supply (not shown).

The lower end of the siphon 18 described above empties into the primary recovery tank 24. The preferred configuration of the recovery tanks can be described generally as being an inverted elongated pyramid. In the preferred embodiment the primary recovery tank 24 is 18 inches wide and 56 inches long.

The secondary recovery tank 45 is 12 inches wide and also 56 inches long. Mounted in the shell discharge end of the primary recovery tank 24 adjacent the feed bin 16 and below the lower end of the siphon 18 is a slidable shelf 25. This shelf 25 serves to change the direction of flow of water emptying out of the siphon 18 and deflect the nut meats along the surface of the water contained in the primary recovery tank 24. The length of the shelf 25 is adjusted to obtain the desired flow along the surface of the water to obtain the optimum flow of nut meats along the surface while permitting the shells and shell bearing nut meats to sink to the bottom.

Originating in the bottom of the primary recovery tank 24 and mounted along the end of the tank referred to above as the shell discharge end is the primary auger conveyor 26. This auger conveyor 26 has a lower mounting bearing 27 and an upper mounting bearing 28. Extending through the upper mounting bearing 28 is a short shaft (not shown) upon which is mounted the primary auger conveyor drive sprocket 29.

This primary drive sprocket 29 is interconnected by a drive chain 30 with the secondary drive sprocket 31, the power sprocket 32, and the auger conveyor drive motor 33.

Adjacent the upper end of the prime auger conveyor 26 is a cross feed chute 34 leading into the secondary recovery tank 45. Emptying also into the cross feed chute 34 is the discharge water from the secondary recovery tank 45 water recirculating means.

The cross feed chute 34 is constructed with a baffle 35 which deflects the return water underneath the nut meat shell combination conveyed into the cross feed chute.

At the lower end of the primary recovery tank 24 is mounted a nut meat water separation means 36 comprising a weir 37 (see FIG. 7) over which the water and floating nut meats flow. Adjacent the weir 37 is a pervious meat chute 38. The apertures in the meat chute 38 permit water to drain through and falls downward into the water chute 39. The nut meats continue to move forward along the meat chute 38 into a suitable container (not shown).

The water chute 39 empties into the primary surge tank 40. Mounted adjacent the surge tank 40 is water recirculating means comprising a centrifugal pump 41, a driving motor 42, and a return pipe 43 having its discharge end in the heretofore described feed bin 16. Mounted in the return pipe 43 is a regulating valve 44 which enables the operator to vary the rate of flow of the primary tank water recirculating means.

The primary recovery tank is constructed preferably of stainless steel. As previously stated, the configuration is an elongated pyramid. The tank 24 is constructed with a shell discharge end incorporating a primary auger conveyor 26 and shield, a meat discharge end, and a left and right side. All seams are heliarc welded. The shell discharge end of the primary recovery tank 24 is that end where the siphon and feed bin are located. The meat discharge end is that end where the water and nut meat separating means 36 is located. The tanks may be attached to the frame by any one of many conventional fastening means.

Except for its dimensions the secondary recovery tank 45 is substantially identical in construction to the primary recovery tank 24. Only the specific differences in structure will be herein described. Adjacent the top of the secondary recovery tank 45 is a hot water valve 46 attached to an external source of hot water (not shown). Hot water is utilized as make up water in the secondary tank 45 of from 100° F. to 150° F. The optimum operating temperature is indicated to be 105° F. to 110° F.

The water recirculating means originating in the secondary recovery tank 45 surge tank 47 discharges 48 into the upper end of the cross feed chute 34. It should be noted that the regulating valve 49 in the secondary recovery tank 45 water recirculating means may be adjusted by the operator to obtain the desired rate of flow along the surface of the water in the secondary recovery tank to obtain the optimum recovery of nut meats from the secondary recovery tank 45 by obtaining the desired rate of flow over the weir 37 of the secondary nut meat water separation means 36.

The fluid recirculation flow within the system is illustrated schematically in FIG. 8. The water flows from the primary recovery tank 24 to the primary surge tank 40 from which it is pumped through the regulator valve into the feed bin 16. The natural flow siphon picks up the water and cracked nut mixture and lifts the fluid mixture past the starter valve 23 over the apex of the siphon the fluid flows downward past the outlet valve 22 and thus returns to the primary recovery tank 24.

The nutmeat fluid separation means 36 of the primary recovery tank 24 and the secondary recovery tank 45 are identical in structure and operation except for dimensions. Referring to FIGS. 6 and 7, the aqueous fluid floats the buoyant nutmeats over a weir 37, the nutmeats flow down the chute to a suitable receptacle (not shown) while the fluid drops through the pervious meat chute 38 into the water chute 39 and flows into the primary surge tank 40 or the secondary surge tank 47 where identical centrifugal pumps 41 recirculate the fluid into the respective systems.

Reference is further made to FIG. 8 concerning the flow in the secondary system. Starting with the secondary recovery tank 45 the water flows into the secondary surge tank 47 from there it is pumped past the regulator valve 49 into the cross feed chute 34 through discharge 48 adjacent the baffle 35 from where it flows back into the secondary recovery tank 45. The above described fluid recirculation system is a controlling factor in the adaptability of this invention to an extreme conservative use of the fluid medium if desired.

The terminus of the secondary auger conveyor is the waste chute 50. The water recirculation means heretofore described is quite conservative in the utilization of water and is much more efficient in this respect than the prior art. Some excess water does however flow from the machine through the overflow chutes 51 of the surge tanks 40 and 47. The excess water is caught in a drip pan 52 placed under the machine. This drip pan may be connected to any suitable drain. A higher rate of flow of water through the water feed valve 17 will result in more overflow water and a consequent cleaner operation of the system. A rate of flow of approximately 12 gallons per minute has been found to be satisfactory in the primary recovery tank 24. Each of the recovery tanks is provided with a drain plug 53 which can be utilized to empty the tanks.

The machine is supplied with cracked nuts by a conveyor (not shown) to the feed bin 16. The make up water supply from an exterior source also flows into the feed bin 16 through the water feed valve 17. Mounted in this feed bin 16 below the operation water level is the mouth of the siphon 54 with feed hopper attached. In a preferred embodiment of this invention a 3-inch pipe is utilized with a suitable gate valve mounted at each end. The height of the apex of the siphon should be determined by the prevailing atmospheric pressure in the area where the machine is to be utilized. In the preferred embodiment of the invention an apex of 28 feet was used. At near sea level an apex of approximately 30 feet may be uitlized. In view of the fact the siphon 18 is natural flow in its operation with no exterior drive force supplied, the height of the apex must be kept below the minimum atmospheric pressure which can reasonably be anticipated.

In first placing the machine in operation the siphon 18 must be filled to capacity with water. This is accomplished by closing the inlet valve 19 and the outlet valve 22. Next, the bleeder valve 21 is opened and starter valve 23 is opened. The starter valves 23 are connected to a presurized water supply. The pressure need only exceed 15 pounds per square inch; therefore, a city water supply is completely adequate. The two starter valves 23 are opened and left open until the siphon 18 is filled with water and water free of bubbles continuously flows from the bleeder valve 21. Since the bleeder valve 21 has its terminus at the apex of the siphon 18, water will constantly overflow when the siphon 18 is completely filled. The bleeder valve 21 is closed and the starter valves 23 are then closed. The siphon is now in condition for starting operation. The primary and secondary tanks 24 and 45 should be completely filled with water and the centrifugal pumps 41 of the water recirculating means placed in operation. The water feed valve 17 should be opened and the water level in the feed bin 16 raised to overflow. The inlet valve 19 can now be opened and the siphon 18 remain filled due to atmospheric pressure on the column of water in the feed bin 16. The outlet valve 22 may now be opened to initiate a flow through the siphon. Experience has proven that the inlet and outlet valves are preferably opened substantially simultaneously. As the outlet valve 22 is opened the rate of flow of water through the water feed valve 17 may need to be increased to maintain a water level above the mouth of the siphon 54 at all times in order to not interrupt the flow of the siphons.

The conveyor feeding cracked nuts to the feed bin can now be started simultaneously with the augur conveyors.

The flow of the water cracked nuts mixture over the apex of the siphon has the effect of placing the mixture under a progressively increasing partial vacuum as the mixture moves upward, and the reverse becomes true during the flow through the down leg of the siphon. The water and partially processed cracked nuts are fed into the primary recovery tanks. The subjecting of the cracked nuts water mixture to the siphoning step in the process evacuates virtually all of the air from small pockets in the shells and fills the voids with water. This results in the shells being effectively wetted which increases their specific gravity to more than one. The shells therefore sink as they are unleashed from the siphon into the primary recovery tank. The nut meats, in the case of pecans, have a specific gravity less than one float on the surface and flow toward the lower end of the recovery tanks. A stream of water flows over the weir 37 at the lower end of the recovery tanks 24 and 45 carrying the floating nut meats forward into the pervious meat chute 38. The nut meats continue to flow forward along the meat chute. The water drops through the perforations in the meat chute 38 into the water chute 39 and into the surge tank. The centrifugal pumps 41 maintain the water in the surge tanks 40 and 47 at a relatively constant level. The water is pumped from the secondary surge tank into secondary recovery tank 45 through the cross feed chute 34. This water circulation not only serves to fill the secondary recovery tank 45 but also sluices the partially processed cracked nuts through the cross feed chute 34. The secondary surge tank 47 water recirculating means serves the function of providing a predetermined surface flow in the secondary recovery tank 45 which may be adjusted for optimum efficiency in operation.

Much of the prior art in this science requires a substantial water supply. An advantage of this invention is a relatively conservative use of water. In actuality as little or as much water as desired can be used. A freer use of water does however result in a cleaner output from the machine. The auger conveyor 26 in the primary recovery tank 24 removed the shells together with some unseparated nut meats from the bottom of the tank and lifts the mixture upward. The agitation of the shells and remaining nut meats results in some further detaching of meats from the shells. The mixture is fed from the conveyor into the cross feed chute 34 and sluiced into the secondary recovery tank 45. The water in the secondary recovery tank 45 is maintained at a temperature of 100° F. to 150° F. This usually results in a temperature differential between the two recovery tanks of from 30° F. to 80° F. The make up water added to the secondary recovery tank 45 is from a hot water source adequate to maintain the desired temperature differential. No exact explanation is advanced as to why the process operates more efficiently with hot water in the secondary recovery tanks. In theory, the change in specific gravity resulting from the heating has been advanced. However, the improved operation is most probably due to the increased wetting properties of the hotter water and the expanding effect of the hot water on the nut shells and meat.

The operation of the machine described above is particularly applicable to the processing of cracked pecans. In processing certain other nuts with meats of a specific gravity greater than one, brine is used as the buoyant liquid medium.

It is readily apparent that a simplified device incorporating the siphoned means 18, the feed bin 16, the primary recovery tank 24, the nut meat water separation means 36 and water recycling means to the feed bin 16 is within the scope of this disclosure. The preferred embodiment is more sophisticated and efficient, however, the simplified embodiment is intended to be within the scope of this invention.

It is desirable to construct the recovery tanks of a non-corrosive metal such as stainless stell. The auger conveyors while basically may be made of a mild steel, should be plated with cadmium, zinc or chrome to render them less corrosive. This is particularly necessary when the machine is to be operated with brine as the buoyant liquid.

It is understood, of course, that the foregoing disclosure relates only to the preferred embodiment of the invention and that it is intended to cover all changes and modifications of the example of the embodiment herein chosen for the purpose of this disclosure, which do not constitute departures from spirit and scope of this invention.

Having described my improved process and apparatus for practicing my invention, what I claim is:

1. A machine for separating nut meats from shells in cracked nuts comprising a mounting frame, a feed bin attached thereto, a primary recovery tank having a top and bottom, said primary recovery tank constructed and arranged in a generally elongated rectangular inverted pyramidal configuration said primary tank construction including a first elongated side and a second elongated side, a first shortened side and a second shortened side, said tank filled with water, a siphon originating in said feed bin and terminating in said primary recovery tank adjacent said first shortened side and substantially at the mid-point between the said first and second elongated sides, a substantially horizontal table movably mounted in said primary recovery tank below the discharge end of said siphon for adjustment of the position of said table relative to the discharge end of said siphon to receive the discharge of said siphon and deflect and direct the flow along the surface of the water contained in said tank in the direction of the said second short side, a conveyor mounted in said primary recovery tank originating near the bottom and extending diagonally upward the top of said recovery tank adjacent to said first shortened side, a pervious meat chute attached to said recovery tank near the top of said tank adjacent said second shortened side said pervious meat chute including apertures capable of supporting solid particles while permitting liquid to drain through, a water chute, a water recirculating means, the water chute inter-connecting said pervious meat chute and said water re-circulating means, said water recirculating means returning water to said feed bin.

2. The invention of claim 1 including a cross feed chute inter-connecting the said conveyor and a second recovery tank having the top and bottom said secondary recovery tank constructed and arranged in a generally elongated rectangular inverted pyramidal configuration, said secondary recovery tank construction including a first elongated side and a second elongated side, a first shortened side and a second shortened side, said cross feed chute terminating adjacent first said shortened side and substantially at the mid-point between the said first and second elongated sides, constructed and arranged in such a position as to discharge and direct the flow of said cross feed chute along the surface of the fluid contained in said secondary tank in the direction of said second shortened side, conveyor means mounted in the secondary recovery tank originating near the bottom and extending diagonally upward above the top of said recovery tank, separation means connected to said secondary recovery tank, controllable water re-circulating means for returning the water from the said separation means to the said cross feed chute, and a baffle mounted in the said cross feed chute.

3. The invention of claim 1 wherein said water re-circulating means comprises a centrifugal pump and an adjustable valve constructed and arranged to regulate the flow in said water recirculating means.

4. The invention of claim 3 including: a surge tank in the water re-circulating means constructed and arranged to accumulate and stabilize the flow of fluid in the said water re-circulating means.

5. In a machine for separating nut means from shells, a primary recovery tank, having a top and bottom said primary recovery tank constructed and arranged in a generally elongated rectangular inverted pyramidal configuration said primary recovery tank construction including a first elongated side and a second elongated side, a first shortened side and a second shortened side, feed means having a discharge end table movably mounted horizontally near the top of said tank adjacent said first shortened side and substantially at the mid-point between the said first and second elongated sides and below the discharge end of said feed means to receive an input flow of the fluid nut meat shell mixture and deflect and direct the flow along the surface of the water contained in said tank in the direction of the said second shortened side, an auger conveyor diagonally mounted therein extending from substantially the bottom to above the top of the tank adjacent the first said shortened side, a pervious meat chute attached to said recovery tank near the top of said tank adjacent the said second shortened side, said pervious meat chute including apertures capable of supporting solid particles while permitting liquid to drain through a weir intermediate said pervious meat chute and said recovery tank parallel and adjacent said second shortened side, a water chute and a water recirculating means, the water chute inter-connecting said pervious meat chute and the water re-circulating means, said water recirculating means returning water to said feed bin.

6. The invention of claim 5 wherein the water re-circulating means comprises a centrifugal pump, an adjustable valve constructed and arranged to regulate the rate of flow in the said water re-circulating means, a surge tank in the water re-circulating means constructed and arranged to accumulate and stabilize the flow of fluid in the said water re-circulating means.

7. The method of separating nut meats from shells and cracked nuts comprising the steps of: subjecting a mixture of cracked nuts and water to a partial vacuum, reducing the partial vacuum to atmospheric pressure, directing a nut meat shell mixture along the surface of a first fluid, separating the floating nut meats from the non-floating shells and nut-meas, directing said non-floating shells and nut-meats along the surface of a second fluid, said second fluid being at a raised temperature of plus 30° F. to plus 80° F. above the temperature of the first said fluid separating the floating nut meats from the shells, removing the shell residue from the fluid.

8. The continuous method of separating nutmeats from shells in cracked nuts comprising the steps of: subjecting a mixture of cracked nuts and the buoyant liquid to a partial vacuum, returning the mixture to normal atmospheric pressure, flowing the mixture along the surface of a buoyant liquid in a primary recovery tank, flowing the buoyant liquid bearing floating nutmeats over a weir, collecting the nutmeats, removing the non-floating nutmeat shell mixture from the bottom of the primary recovery tank, flowing the non-floating nutmeat and shell mixture along the surface of a buoyant liquid in a secondary tank, maintaining the buoyant fluid at a raised temperature differential of plus 30 degrees Fahrenheit to plus 80 degrees Fahrenheit over the said buoyant fluid in the said primary tank, and flowing the floating nutmeats over a weir, collecting the floating nutmeats, and removing the non-buoyant shells from the bottom of the secondary recovery tank.

References Cited
UNITED STATES PATENTS

| | | | |
|---|---|---|---|
| 1,895,505 | 1/1933 | Wuensch | 209—173 |
| 1,963,861 | 6/1934 | Noll | 209—173 |
| 2,530,676 | 11/1950 | Berg | 209—173 |
| 1,743,179 | 1/1930 | Zeb | 209—173 |
| 2,225,459 | 12/1940 | Palmrose | 209—173 |
| 2,241,737 | 5/1941 | Romberg | 209—3 |
| 2,378,357 | 6/1945 | Erck | 209—172.5 |
| 2,451,528 | 10/1948 | Armstrong | 209—3 |
| 2,590,756 | 3/1952 | Colin | 209—173 |
| 2,718,966 | 9/1955 | Hardinge | 209—173 |
| 3,249,219 | 5/1966 | Sanfilippo | 209—2 |

FRANK W. LUTTER, Primary Examiner

U.S. Cl. X.R.

137—142; 209—4, 11, 173